United States Patent [19]
Levinson

[11] Patent Number: 5,925,281
[45] Date of Patent: Jul. 20, 1999

[54] FOR USE IN A FREEZER AND IN A MICROWAVE OVEN, A MICROWAVE-REFLECTIVE VESSEL WITH A COLD-KEEPING AGENT AND METHODS FOR ITS USE

[76] Inventor: Melvin L. Levinson, 8 Stratford Cir., Edison, N.J. 08820-1830

[21] Appl. No.: 09/102,253

[22] Filed: Jun. 22, 1998

[51] Int. Cl.[6] .................................................. H05B 6/80
[52] U.S. Cl. ........................................ 219/725; 426/107
[58] Field of Search .......................... 426/107; 219/725, 219/729, 730, 734

[56] References Cited

U.S. PATENT DOCUMENTS

| | | | |
|---|---|---|---|
| 3,985,990 | 10/1976 | Levinson | 219/734 |
| 4,233,325 | 11/1980 | Slangan et al. | 426/107 |
| 4,488,817 | 12/1984 | Uesaka et al. | 366/149 |
| 5,315,083 | 5/1994 | Green | 219/734 |
| 5,558,798 | 9/1996 | Tsai | 219/734 |

*Primary Examiner*—Teresa Walberg
*Assistant Examiner*—Jeffrey Pwu

[57] ABSTRACT

A microwave-reflective vessel with a cold-keeping agent is chilled in a freezer. Then a frozen foodstuff, contained in the chilled vessel, is deep heated by microwave energy while the foodstuff's surface is cooled by conventional heat loss to the chilled vessel. The invention concerns frozen, foodstuffs a) that are difficult to penetrate with a spoon, as frozen whipped cream, b) that frozen are too rigid to easily masticate, as a frozen Milky Way®, and c) that, when cooled on the outside and warmed on the inside, provide a novel taste treat, as a cool outside, warm inside, jelly doughnut. Multiple purpose covers are disclosed that a) retard freezer burn when in a freezer, b) maintain freezing temperatures when in a microwave oven, and c) serve as chilled dessert dishes on the dining table.

11 Claims, 1 Drawing Sheet

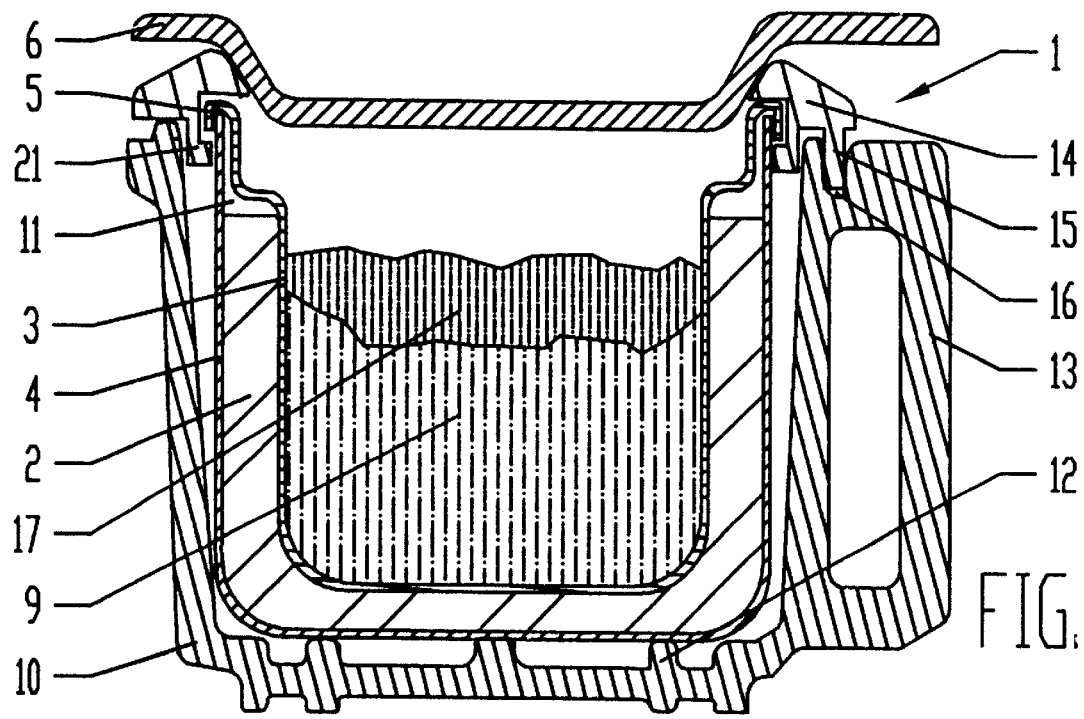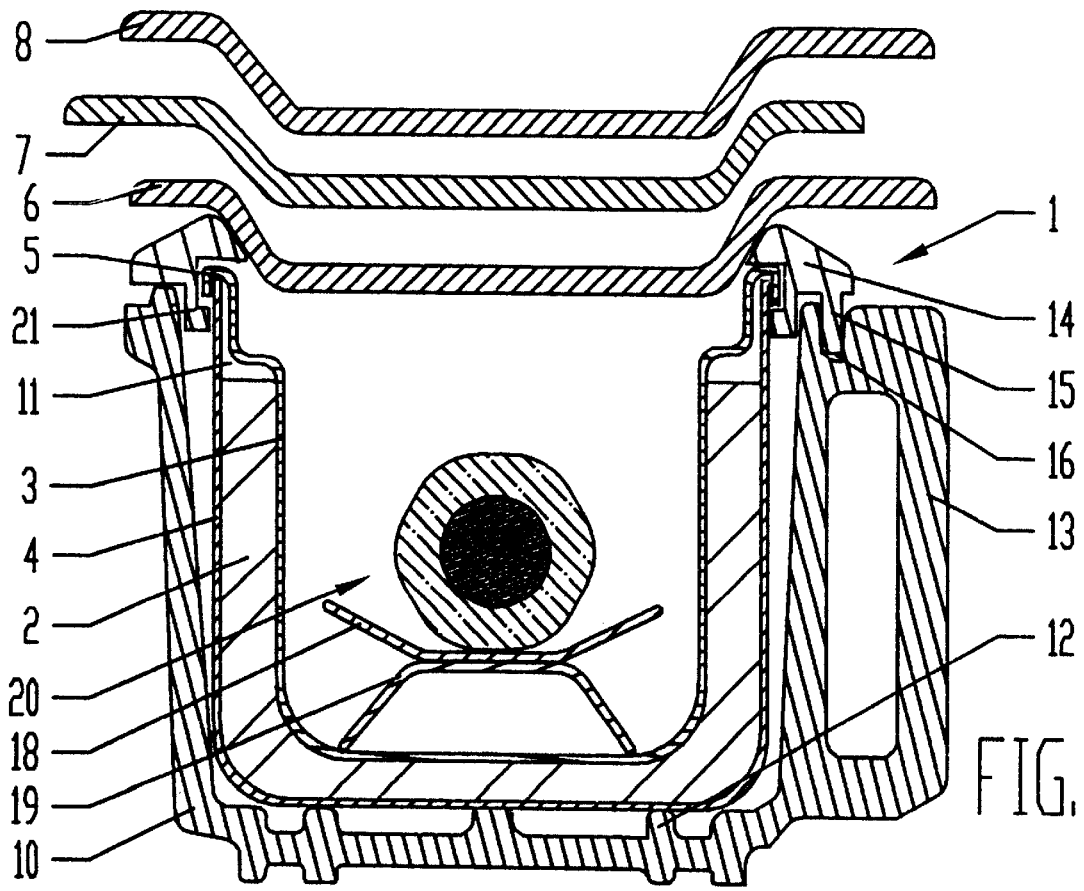

FOR USE IN A FREEZER AND IN A MICROWAVE OVEN, A MICROWAVE-REFLECTIVE VESSEL WITH A COLD-KEEPING AGENT AND METHODS FOR ITS USE

CROSS REFERENCE TO RELATED APPLICATIONS

None

BACKGROUND OF THE INVENTION

1. Field of the Invention

The present invention relates to methods and apparatus for defrosting, in a microwave oven, serving portions of frozen, foodstuffs a) that are difficult to penetrate with a spoon, as frozen whipped cream, b) that are too rigid to easily masticate, as frozen chocolate covered candy and c) that, when arbitrarily frozen and defrosted, provide novel tasty results, as a "cool outside, warm inside" jelly doughnut.

2. Description of the Prior Art

It is known to defrost and heat a TV dinner, packaged in aluminum foil trays, in microwave ovens, for example, U.S. Pat. Nos. 3,854,023 and 3,985,990.

It is known to selectively defrost a frozen foodstuff in a microwave oven by selectively covering parts of it with microwave-reflective material. For example, it is known to defrost and heat, in a microwave oven, the chocolate topping on a hot chocolate ice cream dessert, without defrosting the ice cream, by mechanically shielding the ice cream from microwave energy.

U.S. Pat. No. 4,233,325 teaches how to selectively defrost a foodstuff in a microwave-reflective two compartment apparatus.

It is known to temper frozen meat, in an industrial microwave oven, by exposing, in a chilled environment, the frozen meat to microwave energy.

U.S. Pat. No. 4,488,817 teaches an ice cream maker that comprises an outer vessel and inner vessel having an annular space there between. The annular space is filled with a freezing mixture. Ingredients for making ice cream are placed in the inner vessel. The ingredients freeze while they are slowly stirred with paddles that one operates manually or with an electric motor.

My copending U.S. patent application Ser. No. 08/746,809, filed Nov. 18, 1996, for "Methods for Denaturing and Whipping into a Foam Protein Found in Milk and Egg and the Resulting Product," teaches to prepare milk and egg products in a microwave-reflective vessel with a cold-keeping agent. Copending patent application Ser. No. 08/746,809 teaches that whole shelled egg, and whole milk, two products that do not normally whip into a foam, when whipped as taught, therein, whip into lasting, useful foams. This copending application teaches that, when flavored, chilled and hard frozen, these novel foams may be employed as a confection. These foam confections may be used either in combination with or to replace conventional whipped cream, ice cream, ice milk, sherbet, frozen yogurt and the like. These foam confection may be scooped and served in the manner of either whipped cream or ice cream, i.e., in or on cones, banana splits, sundaes, sodas, and the like. Copending patent application Ser. No. 08/746,809 teaches that certain foamed confections, that are rich in saturated fat, freeze into a rigid mass that is difficult to penetrate with a spoon or scoop.

It is known that frozen foodstuffs, when defrosted in a microwave oven, are subject to edge heating, end heating, thermal runaway, selective and spot heating.

STATEMENT OF THE PRESENT INVENTION

It is an object of the present invention to provide apparatus and methods for selectively defrosting certain types of frozen foods, for example, a) rigidly frozen whipped cream, b) rigidly frozen chocolate covered candy, and c) frozen jelly doughnuts and the like.

It is an object of this invention to provide, a multiple-utility, metal, double-walled, open-top device that is useful in a freezer, in a microwave oven and on a dining table. A vessel that when it is outside of the freezer is suitable for holding a foodstuff contained therein, below its freezing point for, a least, 10 minutes.

It is an object of this invention to provide a chilled cold-keeping agent contained in a microwave-reflective container that, when exposed to microwave energy in a microwave oven in juxtaposition with a foodstuff, the foodstuff is heated internally by the microwave energy while its surface is cooled by being in proximity to the chilled cold-keeping agent.

It is an object of this invention to provide a multiple purpose cover for the combination freezer and microwave oven vessel of this invention A cover designed a) to retard freezer burn to a foodstuff when in a freezer, b) to maintain freezing temperatures therein when in a microwave oven, and c) that, during a serving interval, can serve as a chilled dessert dish.

It is an object of this invention to selectively defrost rigidly-frozen, chocolate bars, for example, Snickers®, Baby Ruth®, Milky Way®, and 3 Musketeers®, in a microwave oven, so that their outer chocolate covering is cold and their interior is defrosted and warmed to please individual preference.

It is an object of this invention to selectively defrost frozen, jelly doughnuts, apple turnovers, Danish pastry and the like, in a microwave oven, so that, their outer dough is cool and their filling is warm. The cook selects the amount of microwave exposure and amount of standing time required to suit individual preferences as to the warmth of the filling.

The present invention concerns a microwave-reflective, freezing and serving vessel. The present invention concerns defrosting certain frozen foodstuffs, for example, a) rigidly frozen whipped cream, b) the rigidly frozen egg and milk whipped cream foams of my copending patent application Ser. No. 08/746,809, c) frozen jelly doughnuts and the like and c) rigidly frozen chocolate covered candy, in a microwave oven. When defrosted, in a microwave oven, these frozen foodstuffs are subject to edge heating, end heating, thermal runaway, selective and spot heating. Surprisingly, these dual consistency foodstuffs, when defrosted as taught herein, reconstitute to a soft, ready to eat, condition.

DESCRIPTION OF THE DRAWINGS

FIG. 1 is a side view illustration, in cross-section, of a freezing and serving container containing a frozen confection with a combination lid and serving container.

FIG. 2 is a side view illustration, in cross-section, of a freezing and serving container, containing a dual consistency foodstuff, for example, a jelly doughnut or a chocolate covered candy bar, with three stacking-lid, serving containers.

DESCRIPTION OF THE PREFERRED EMBODIMENTS

FIGS. 1 and 2 are side-view, cross-sections of a freezing and serving combination freezer and microwave oven apparatus 1 that includes a double-walled cylindrical vessel consisting of inner vessel cup member 3 and outer vessel cup member 4 each having an upper open end and a closed bottom. Preferably, vessel cup members 3 and 4 are made of thin metal, e.g. 2 to 250 mils. The upper ends of the inner and outer vessel cup members 3 and 4 are hermetically sealed by shaping the rim of one of the vessel cup members to form seam 5 with the rim of the other vessel cup member. Preferably, vessel 3 has an open top of 7 to 30 square inches.

Chilling agent 2 substantially fills the chamber defined by cup members 3 and 4. The chilling agent typically is a brine mixture of rock salt and ice particles. An air space 11 is maintained over chilling agent 2 to avoid deforming vessel cup members 3 and 4 as a result of thermal expansion and contraction.

In FIGS. 1 and 2, one or more saucer-shaped, serving dishes of microwave-transparent material, for example, ceramic saucers, are illustrated as cover members 6, 7 and 8 to cover apparatus 1. In place on apparatus 1, in a freezer, these cover members 6, 7 and 8, retard freezer burn. When employed in a microwave oven, cover members 6, 7 and 8 maintain the freezing environment inside of apparatus 1. When apparatus 1 is removed from the freezer, cover members 6, 7 and 8 can be employed as chilled serving saucers to receive and dispense serving portions of frozen confection 17.

To support inner vessels 3 and 4, an outer receptacle 10, made of an appropriate molded plastic material, is provided. Outer receptacle 10 is adapted to receive and support vessels 3 and 4 with an appropriate clearance between the bottom of its inside wall and the cylindrical wall of outer vessel cup member 4. A plurality of supporting ribs or buttons 12 are provided on the inner wall of the bottom of outer receptacle 10. Handle 13 for receptacle 10 facilitates manipulation and support of receptacle 10.

To provide a removable member that secures and seals receptacle 10 to vessels 3 and 4 and, at the same time, provides a soft, secure support surface for cover 6, a soft, flexible coupling ring 14 is provided. Ring 14 has a peripheral shoulder portion 21 snugly engaging the rim of receptacle 10. Ring 14 snugly receives seam 5 of vessels 3 and 4.

During the operation of the device, to prevent relative rotation of vessels 3 and 4, with respect to the receptacle 10, a rotation prevention means, depending lug 15, is formed on the lower surface of ring 14. Lug 15 is received in rotation preventing recess 16 formed on the upper portion of receptacle handle 13.

OPERATION

Some confections, such as frozen, whipped-cream, freeze so rigidly that they cannot be freely scooped out of a freezer container with a spoon. Copending patent application Ser. No. 08/746,809, teaches that whipped egg and milk products, rich in saturated fats, freeze into a hard mass that cannot be freely hand scooped out of the container in which it is contained.

In combination freezer and microwave oven apparatus 1, a rigid, frozen confection 9, as whipped, heavy-cream can be selectively heated in a microwave oven so that individual portions of whipped cream may be scooped out, with an ice cream scoop, and, thereupon, served as a chilled dessert.

In operation, in FIG. 1, a rigidly-frozen confection 9, in inner vessel 3 of double walled combination freezer and microwave oven apparatus 1, is placed in a microwave oven (not shown) and exposed to microwave energy for a predetermined time. Exposed to a predetermined amount of microwave energy entering through the open top of vessel 3, starting from the top and progressing to the bottom, rigidly, frozen confection 9 becomes non-rigid confection 17. Care must be taken in selecting the size of the upper opening and the cavity size of the inner vessel cup member 3 so that microwave energy will not be prevented from reaching the bottom of inner vessel 3. Advantageously, after it is exposed to microwave energy, the non-rigid, confection 17 that was not promptly scooped out of inner vessel 3, quickly freezes back into rigidly frozen confection 9.

Stored at room temperatures, the useful life of whipped cream is limited. This method permits convenient long term storage of frozen whipped cream and similar rigidly frozen products. This method permits the rapid defrosting, of rigidly frozen confection 9, into individual serving portions that are easily scooped out of inner vessel 3 and, thereafter, provides for the unattended, speedy freezing of any confection 17 not scooped out. When they are employed as chilled, serving dishes, chilled cover-members 6, 7 and 8 provide a useful way to hold, transport, serve and maintain cold individual portions of scooped-out confection 17.

When it is time to prepare a different confection therein, one must first clean out the unused frozen confection left in vessel 3. So that chilling agent 2 will remain frozen and ready to freeze a new confection, the chilled combination freezer and microwave oven apparatus 1 is exposed to microwave energy until the unwanted remains, of frozen confection, in vessel 3, become soft. Thereafter, water is added to rinse these defrosted remains out of vessel 3. If this heating-cleaning process is performed quickly, the chilling agent 2 does not have time to defrost. Note, chilling agent 2, is surrounded by metal surfaces that shield it from microwave energy.

When reconstituted in prior art containers, in a microwave oven, certain frozen dual consistency foodstuffs, as a) jelly doughnuts and apple turnovers, b) chocolate covered candy bars and c) similar dual consistency foodstuffs, provide results that some may consider unsatisfactory. Unsatisfactory because, when defrosted in prior art containers in a microwave oven, the outer shell and the core of these dual consistency foodstuffs are subjected to microwave edge heating, end heating, thermal runaway, selective and spot heating.

When reconstituted in combination freezer and microwave oven apparatus 1, the aforementioned dual consistency foodstuffs are subject to the same microwave edge heating, end heating, thermal runaway, selective and spot heating that occurs in prior art containers. Combination freezer and microwave oven apparatus 1 provides a more desirable finished product than that provided by prior art containers because, during the time the foodstuff is exposed to microwave energy and for a standing time thereafter, heat is transferred, by conventional infrared heat transfer, to the cold keeping agent resulting in end, edge, selective and spot surface cooling. Apparatus 1 provides improved results because, during and after exposure, of the aforementioned dual consistency foodstuffs, to microwave energy, the outer member (e.g. the chocolate coating of the candy, and the baked dough of the jelly doughnut), are rapidly returned to either their chilled state, in the case of the chocolate coating, or to a uniform, warm tasty state in the case of the baked dough.

Jelly doughnuts, apple turnovers, Danish pastry and the like are products that are normally purchased stored and eaten at room temperatures. This invention teaches to arbitrarily freeze and defrost these products to provide a novel tasty result. With practice a cook, using combination freezer and microwave oven apparatus 1, can provide a hitherto unknown desirable result. Defrosted, as taught herein, a frozen jelly roll changes into a tasty baked dough surrounding a warm jelly that is not present in a freshly baked jelly roll. Surprisingly, some seemingly stale jelly rolls, and the like, frozen and reconstituted in combination freezer and microwave oven apparatus 1, taste better, to some, than the same jelly doughnut tasted when it was conventionally prepared and served.

In operation, in FIG. 2, inner vessel 3 of combination freezer and microwave oven apparatus 1, is shown equipped with removable microwave permeable receiving container 18 on removable microwave permeable support container 19. Preferably container 18 and support container 19 (shown inverted) are clear Pyrex saucers. The purpose of containers 18 and 19 is to permit the positioning of dual consistency frozen foodstuff 20 in container 18, out of contact with the floor and inner walls of inner vessel 3. The operator chooses the size and number of containers consistent with the number and type foodstuff reconstituted. Preferably containers 18 and 19 are chilled within inner vessel 3 prior to use. Chilled containers 18 and 19, covers 6, 7 and 8, and chilled apparatus 1 join one another in keeping cool the outer layer of dual consistency foodstuff 20.

In operation, in FIG. 2, a hard frozen dual consistency foodstuff 20 is placed, on container 18, in pre chilled combination freezer and microwave oven apparatus 1. Chilled saucer-covers 6, 7 and 8, are placed on apparatus 1 and the assemblage is exposed to microwave energy for a predetermined time. Thereupon, the reconstituted dual consistency foodstuff 20 is preferably allowed to remain in inner vessel 3 for a predetermined time. Then, the cooled outside and defrosted inside, dual consistency foodstuff 20 is removed from apparatus 1 and either eaten directly from chilled receiving container 18 or served on chilled saucer-covers 6, 7 and 8.

In operation, exposure to microwave energy heats the outer member of a dual consistency foodstuff as well as its inner member. During and after exposure to microwave energy, the outer member loses heat (e.g. infrared energy) added from exposure to microwave energy to the cold-keeping agent more rapidly than does the inner member. Said another way, the dual consistency foodstuff is deep heated by microwave energy and cooled by the conventional loss of infrared energy from its surface.

By proper selection of the amount and type of chilling agent 2, during a serving interval, combination freezer and microwave oven apparatus 1 may be placed on a dining table as a cold-maintaining, serving platter of frozen confection. The frozen confection maintains its intended consistency until chilling agent 2 has defrosted.

Combination freezer and microwave oven apparatus 1 has multiple utility. When not exposed to microwave energy, as taught supra, combination freezer and microwave oven apparatus 1, may be used as a cold-maintaining serving container for a variety of chilled foodstuffs. Chilled saucers 6, 7 and 8 may be used to serve serving portions of chilled foodstuffs therein.

The above described apparatus and methods are illustrative of the application of the principal of the invention. Other arrangements and methods may be devised, by persons skilled in the art, without departing from the spirit and scope of the invention. It is expected that some will employ the claimed invention in laboratory, commercial, and manufacturing equipment. Accordingly, it is to be understood that the present invention is to be limited only by the spirit and scope of the claims that follow.

I claim:

1. A method for heating, in a microwave oven, a frozen foodstuff while said foodstuff is contained in a cold keeping container with a microwave-shielded cold keeping agent that includes the steps of:

selecting said container, exposing said container to a freezing temperature for, at least, the amount of time required to chill said cold keeping agent to below the freezing temperature of said foodstuff so that said cold keeping agent will, subsequently, maintain, a freezing environment about said foodstuff when said foodstuff is in said container, placing said foodstuff in said container, and subsequently, exposing said foodstuff, in said cold keeping container to microwave energy.

2. The method of claim 1 that includes:

covering said container with at least one cover of microwave-transparent material where said cover can serve as a chilled serving dish.

3. A method of heating a frozen foodstuff in a microwave oven while said foodstuff is contained in a container with a cold-keeping agent that includes the steps of:

chilling a microwave-reflective, double-walled vessel that has an open top and a closed bottom and that comprises an inner cup member and an outer cup member with an annular chamber there-between substantially filled with a cold-keeping agent, to, at least, the freezing temperature of said foodstuff, containing said frozen foodstuff in said inner cup member so that when said vessel is exposed to microwave energy, said microwave energy can defrost, at least, a portion of said frozen foodstuff, and subsequently exposing said portion of said frozen foodstuff in said chilled vessel to microwave energy for a predetermined time.

4. The method of claim 3 that includes:

freezing said foodstuff where the nature of said foodstuff is such that, when said foodstuff is frozen, it freezes into a rigid mass, exposing said frozen foodstuff to said microwave energy until, at least, one serving portion, of said rigidly frozen foodstuff, becomes defrosted enough to be served.

5. The method of claim 3 that includes where said frozen foodstuff is placed on a microwave transparent support member in said inner cup member so that microwave energy, entering said inner cup, is able to encompass and enter said foodstuff.

6. A method of claim 5 that includes where said foodstuff is selected from a foodstuff group of that consists of a microwave-lossy outer layer containing a microwave-lossy filling.

7. The method of claim 6 that includes where said frozen foodstuff is a chocolate covered candy.

8. The method of claim 6 that includes where said frozen foodstuff is a baked dough that has a filling.

9. A method for defrosting a serving portion of a microwave lossy frozen foodstuff that includes the steps of:

chilling a metal, double-walled vessel, that has an open top and a closed bottom and that comprises an inner vessel cup member and an outer vessel cup member with an annular chamber there-between substantially filled with a cold-keeping agent, for, at least, the amount of time required to chill said cold-keeping agent to below the freezing temperature of said frozen foodstuff so that, when said vessel is exposed to microwave energy, said cold-keeping agent will supply a below freezing temperature to areas of said foodstuff in close proximity to the metal walls of said inner member, where said inner vessel's open-top permits microwave energy to reach said frozen foodstuff when said frozen foodstuff is located in said vessel, placing said frozen foodstuff into said vessel, and subsequently when it is time to serve said frozen foodstuff, exposing said vessel, with said frozen foodstuff therein, to microwave energy for a predetermined period so that, at least, a top portion, of said frozen foodstuff, is defrosted.

10. The method of claim 9 that includes:

removing a predetermined amount of said defrosted foodstuff from said vessel, and subsequently, letting the defrosted foodstuff, remaining in said inner vessel cup member, freeze from proximity to the cold stored within said chilled cold-keeping agent.

11. The defrosted foodstuff with a cool outer layer containing a warm filling resulting from the method of claim 6.

* * * * *